United States Patent
Eck et al.

(10) Patent No.: US 11,048,330 B2
(45) Date of Patent: Jun. 29, 2021

(54) HAPTIC INTERFACE WITH AT LEAST TWO DEGREES OF FREEDOM HAVING AN INTENTION DETECTOR

(71) Applicant: COMMISSARIAT A L'ENERGIE ATOMIQUE ET AUX ENERGIES ALTERNATIVES, Paris (FR)

(72) Inventors: Laurent Eck, Saint Lubin de la Haye (FR); Edouard Leroy, Paris (FR); Gwenael Changeon, Paris (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 0 days.

(21) Appl. No.: 16/334,901

(22) PCT Filed: Sep. 21, 2017

(86) PCT No.: PCT/FR2017/052539
§ 371 (c)(1),
(2) Date: Mar. 20, 2019

(87) PCT Pub. No.: WO2018/055296
PCT Pub. Date: Mar. 29, 2018

(65) Prior Publication Data
US 2019/0286237 A1    Sep. 19, 2019

(30) Foreign Application Priority Data
Sep. 21, 2016    (FR) ........................................ 1658875

(51) Int. Cl.
*G06F 3/033*    (2013.01)
*G06F 3/01*    (2006.01)
(Continued)

(52) U.S. Cl.
CPC ............... *G06F 3/016* (2013.01); *G05G 5/03* (2013.01); *G05G 9/047* (2013.01); *G06F 3/0338* (2013.01);
(Continued)

(58) Field of Classification Search
CPC  G05G 9/00–04737; G05G 2009/0474–04781; A63F 13/00; G06F 3/033–039
See application file for complete search history.

(56) References Cited

U.S. PATENT DOCUMENTS 5,767,839 A    6/1998    Rosenberg
7,061,466 B1    6/2006    Moore et al.
(Continued)

FOREIGN PATENT DOCUMENTS

WO    WO 2016/050717 A1    4/2016

OTHER PUBLICATIONS

International Search Report dated Nov. 28, 2017 in PCT/FR2017/052539 filed Sep. 21, 2017.
(Continued)

*Primary Examiner* — Sanghyuk Park
(74) *Attorney, Agent, or Firm* — Oblon, McClelland, Maier & Neustadt, L.L.P.

(57) ABSTRACT

A haptic interface with at least two degrees of freedom including at least one element for interacting with a user, at least two passive brakes each extending along an axis, each of the brakes being capable of exerting a resistive force about its axis, the forces being controllable, measurement means for measuring a position of the element for interacting with a user, detection means for detecting the force applied on the element for interacting with the user, a control unit capable of sending commands to the brakes depending on information on the position of the element for interacting with the user and on the force applied on the element for
(Continued)

interacting with the user, such that said passive brakes generate resistive forces according to at least one given haptic pattern.

16 Claims, 4 Drawing Sheets

(51) Int. Cl.
    *G06F 3/041*     (2006.01)
    *G06F 3/045*     (2006.01)
    *G05G 5/03*     (2008.04)
    *G05G 9/047*     (2006.01)
    *G06F 3/0338*     (2013.01)

(52) U.S. Cl.
    CPC ............ *G06F 3/045* (2013.01); *G06F 3/0414* (2013.01); *G06F 3/0416* (2013.01); *G05G 2009/04718* (2013.01); *G05G 2009/04766* (2013.01); *G06F 2203/015* (2013.01)

(56) References Cited

U.S. PATENT DOCUMENTS

| | | |
|---|---|---|
| 2001/0052893 A1 | 12/2001 | Jolly et al. |
| 2004/0017355 A1* | 1/2004 | Shim .................... G06F 3/0338 345/157 |
| 2005/0156892 A1 | 7/2005 | Grant |
| 2006/0146018 A1* | 7/2006 | Arneson ............ G05G 9/04796 345/161 |
| 2009/0146018 A1* | 6/2009 | Konig .................... G05G 9/047 244/221 |
| 2015/0268691 A1* | 9/2015 | Schaub .................... G05G 5/03 74/471 XY |
| 2017/0227980 A1 | 8/2017 | Hafez et al. |

OTHER PUBLICATIONS

French Preliminary Search Report dated May 23, 2017 in French Application 16 58875 filed Sep. 21, 2016.
Liu, B., "Development of 2-DOF haptic devices working with magnetorheological fluids," University of Wollongong Theses Collection, Mar. 5, 2006, 133 pages, XP055424642.
Milecki, A. et al., "Control of a small robot by haptic joystick with magnetorheological fluid," https://www.researchgate.net/profile/Pawel_Bachman/publication/247158668_Control_of_a_small_robot_by_haptic_joystick_with_magnetorheological_fluid/links/00b4951dbc477244fa000000/Control-of-a-small-robot-by-haptic-joystick-with-magnetorheological-fluid.pdf, Jan. 31, 2011, XP055423162, 7pages.
Koyama, T. et al., "Development of an Ultrasonic Brake," Journal of Advanced Mechanical Design, Systems, and Manufacturing, vol. 1, No. 1, Jan. 2007, pp. 122-129, XP055423179.

\* cited by examiner

HAPTIC INTERFACE WITH AT LEAST TWO DEGREES OF FREEDOM HAVING AN INTENTION DETECTOR

TECHNICAL FIELD AND PRIOR ART

This invention relates to a haptic interface with at least two degrees of freedom having an improved haptic sensation.

A haptic interface can be used to control a system such as different devices in a motor vehicle, such as for example an air-conditioning system and a geolocation system. A haptic interface is particularly interesting when the user must keep their attention, in particular visual attention, on the environment for example while driving.

The haptic interface comprises an effector, also called a joystick, with two degrees of freedom. A resistive force opposes the displacement of the effector according for example to its position. By modulating the resistive force according to the position of the effector, it is possible to define haptic patterns that will be sensed by the user when he displaces the effector.

It is sought in particular to create haptic interfaces of which the effector or element for interacting with the user offers at least two degrees of freedom. In order to improve the haptic sensation of the user it is desired to be able to provide good guidance of the effector according to complex trajectories, for example according to radial directions or according to a circle in the plane of the effector.

Such a guiding can be carried out in the case of an active haptic interface that comprises one or several electrical motors. Indeed the motors can be controlled easily to generate forces and/or displacements in order to guide the effector. The controlling of the motors is done using information provided by the position sensor or sensors.

However this type of interface is generally cumbersome due to the electrical motors, has a relatively substantial cost and can sometimes be dangerous for the user since it can untimely generate a force or a displacement that can injure the user. Furthermore, it can have problems in terms of stability making it complicated to control.

Passive haptic interfaces can generate only a resistive force that opposes a force applied by the user by means of brakes. A passive haptic interface can for example comprise one or several magnetorheological brakes, with each brake comprising a magnetorheological fluid of which the apparent viscosity is modified by the application of a magnetic field in order to define the predefined haptic patterns.

An example of a haptic interface with two degrees of freedom is for example described in document U.S. Pat. No. 7,061,466. It comprises two electromagnetic brakes each comprising a shaft arranged perpendicularly with respect to one another. A joystick is mechanically connected to the two shafts by means of a cardan connection in such a way that the two brakes are assembled in parallel. Position sensors are provided to measure the position of the joystick in the two degrees of freedom. The electromagnetic brakes are controlled according to the position of the pre-recorded haptic patterns.

Passive haptic interfaces offer the advantages of being safe and of reduced cost, but they do not make it possible to ensure a guiding of the effector along complex trajectories which are not along the axes of the brakes, offering a good haptic sensation. The brakes are controlled in such a way as to interrupt the displacement of the joystick according to one and/or the other of the directions controlled by the brakes when the position measured is outside of the guiding zone, but the user must then exert a force of the same magnitude as that provided by the brakes in order to disengage himself from this position, which is detrimental to the haptic sensation. In addition the guiding offered by the interface is late, with the effector already being outside of the trajectory.

DISCLOSURE OF THE INVENTION

It is consequently a purpose of this invention to offer a haptic interface with at least two degrees of freedom, that offers an improved haptic sensation, in particular in the guiding of the effector along complex trajectories.

The goal mentioned hereinabove is achieved by a haptic interface with at least two degrees of freedom, comprising an effector mechanically connected to at least two passive brakes, means for detecting the position of the effector and means for detecting the intention of action from the user detecting at least the direction of the force exerted by the user on the effector. Using the knowledge of the position of the effector and of the direction of the force exerted by the user, the control unit can send very early orders to the brakes so they generate quickly or not a resistive force in such a way that it guides the effector along a given trajectory.

Detecting the direction of the force makes it possible to determine very early the intention of the user even before a displacement is detected, it then makes it possible to control the brakes as early as possible. Furthermore the knowledge of the direction of the force allows for a very fine knowledge of the direction that the effector will follow and therefore allows for a very fine control of the brakes.

In this application, the term "passive brake" means a brake that is only able to generate a resistive force against a force exerted by the user. It is not able to generate a force or a displacement in the absence of an exterior force. For example, magnetorheological, electrorheological, electromagnetic brakes are passive brakes. Devices that use the phenomenon of active lubrication via vibrations could also be used, for example implementing a piezoelectric system.

Very advantageously, the amplitude of the force exerted by the user on the effector is measured, which makes it possible to best modulate the resistive forces generated by the brakes, offering more flexible guiding.

Advantageously, the means for detecting the force exerted by the user are arranged on or in the effector, offering an accurate measurement of the force. This can be for example a capacitive sensor.

The subject-matter of the invention then is a haptic interface with at least two degrees of freedom comprising:
  at least one element for interacting with a user,
  at least two passive brakes each extending along an axis, each of the brakes being capable of exerting a resistive force about its axis, said forces being controllable,
  measurement means for measuring a position of the element for interacting with a user,
  detection means for detecting the force applied on the element for interacting with the user
  a control unit capable of sending commands to said brakes depending on information on the position of the element for interacting with the user and on the intention of action from the user, such that said passive brakes generate resistive forces according to at least one given haptic pattern.

Preferably, the means for detecting the intention of action from the user on the element for interacting with the user detect the direction of a force applied on the element for interacting with the user. The means for detecting the intention of action from the user on the element for interacting with the user can measure the intensity of the force.

According to an embodiment, the means for detecting the intention of action from the user comprise at least one force sensor linked to the element for interacting with the user. The force sensor can be a capacitive sensor in contact with the element for interacting with the user and comprise at least several variable capacitors, of which the capacitance varies according to at least the direction of the force applied on the element for interacting with the user.

According to another embodiment, the means for detecting the intention of action from the user on the element for interacting with the user comprise a sensor on each brake, said sensors being able to detect the torques exerted around each one of the axes.

For example, the passive brakes can comprise a fluid of which the apparent viscosity varies according to an external stimulus, for example a magnetorheological fluid, and a system for generating said external stimulus by control in said fluid, and an element for interacting with the fluid arranged in the fluid and mechanically connected to the element for interacting with the user.

According to an additional characteristic, the element for interacting with the user and the passive brakes are mechanically connected by a cardan joint.

The haptic interface can comprise magnetic return means of the element for interacting with the user in a rest position.

Another subject-matter is a method for controlling a haptic interface according to the invention, wherein, when the control unit applies a haptic pattern for guiding the element for interacting with the user at least along one side of a given plane, the control unit:
  determines the position of the element for interacting with the user,
  determines at least the direction of the force applied on the element for interacting with the user
  sends orders to the passive brakes in such a way the resistive forces generated encourage the user to come closer to the plane.

The intensity of the force applied on the element for interacting with the user is advantageously measured and the intensities of the resistive forces applied by the passive brakes depend advantageously on the intensity of the force.

The element for interacting with the user can be guided only on one side of the plane and the intensities of the resistive forces applied by the passive brakes can depend on the position of the element for interacting with the user with respect to the plane in such a way as to provide the user with a haptic sensation when the plane is crossed.

BRIEF DESCRIPTION OF THE DRAWINGS

This invention shall be better understood based on the following description and accompanying drawings wherein.

DETAILED DESCRIPTION OF PARTICULAR EMBODIMENTS

Figure 1:
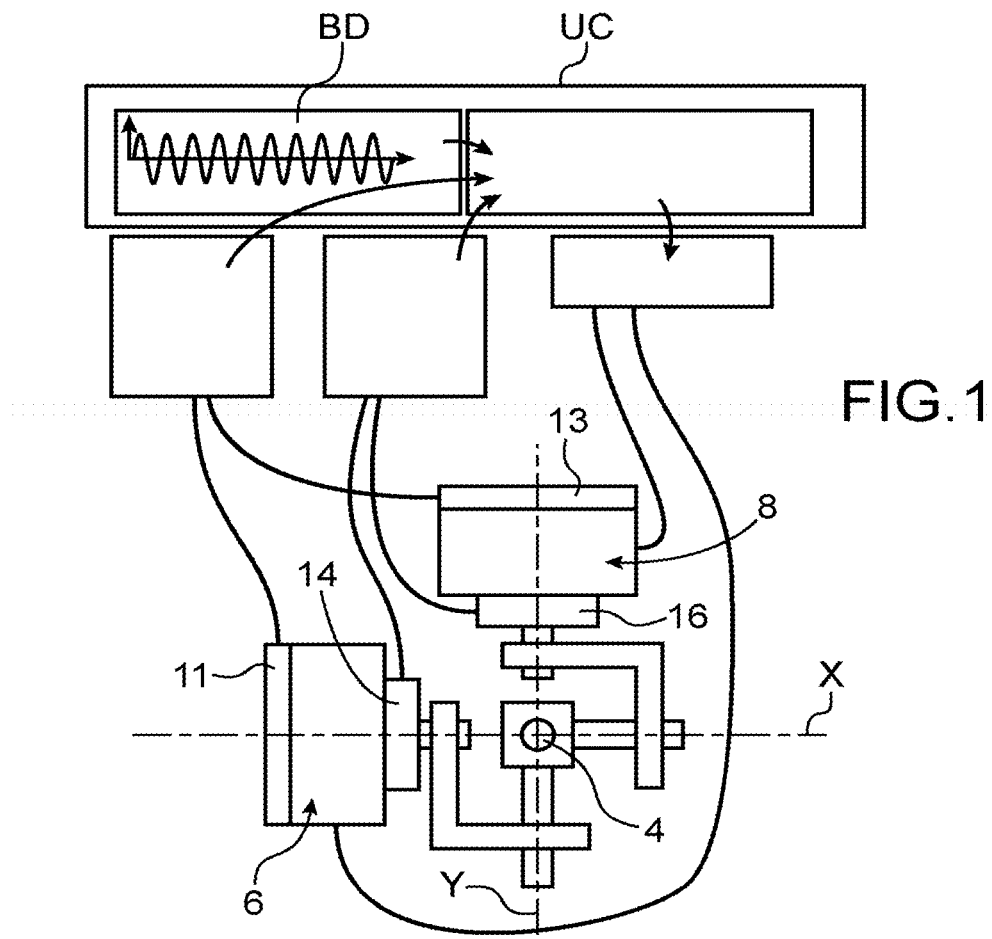
FIG. 1 diagrammatically shows an example of a haptic interface according to the invention.

FIG. 1 diagrammatically shows an example of a haptic interface according to the invention.

The haptic interface comprises an element 4 for interacting with a user or effector articulated on a frame and at least two brakes 6, 8. The effector is mechanically connected to the brakes 6, 8 in such a way as to have at least two degrees of freedom. The brakes are able to apply a braking torque around axes X and Y respectively.

The haptic interface also comprises at least one position sensor 14, 16 of the effector and at least one sensor of the intention of action from the user 11, 13 that detects the force exerted by the user on the effector, and a control unit UC or controller comprising a database BD of haptic patterns and which is able to send orders to the brakes to reproduce a haptic pattern based on the position of the effector, on the force exerted on the effector 4 and optionally on external information. The sensor of the intention of action from the user detects at least the direction of the force.

By knowing the position of the effector and the direction of the force the control unit can provide an effective guiding of the effector and providing a good haptic sensation for the user.

Figure 2:
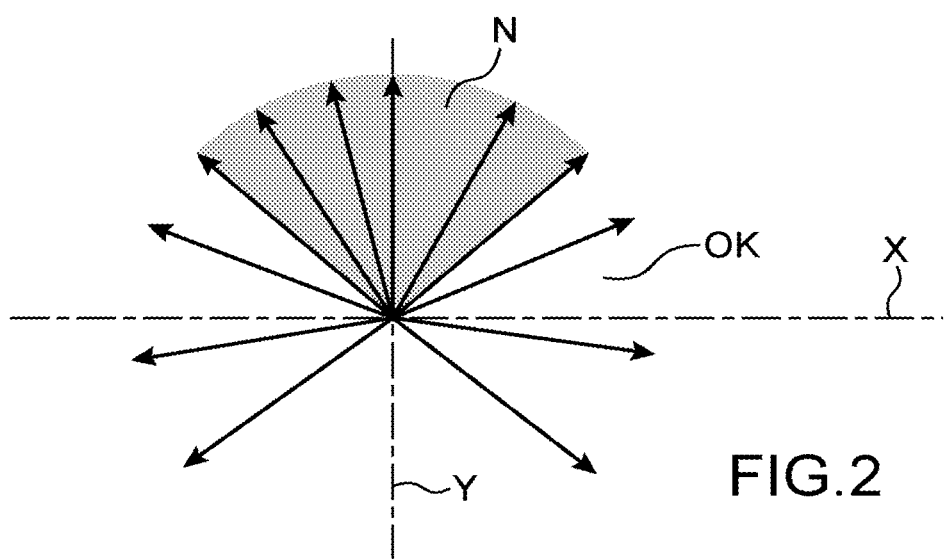
FIG. 2 shows an example for the guiding of an effector that can be obtained thanks to this invention.

FIG. 2 shows a top view of different directions that can be taken by the effector, an authorised zone of displacement designated by OK and a prohibited zone of displacement designated by N. By knowing the direction of the force applied on the effector by the user, the control unit can generate orders for the brakes so that they block given directions, with the orders being sent very quickly and the response from the brakes being very fast, the user is not aware of the activating/deactivating of the brakes respectively on each axis X and Y.

Figure 3A:
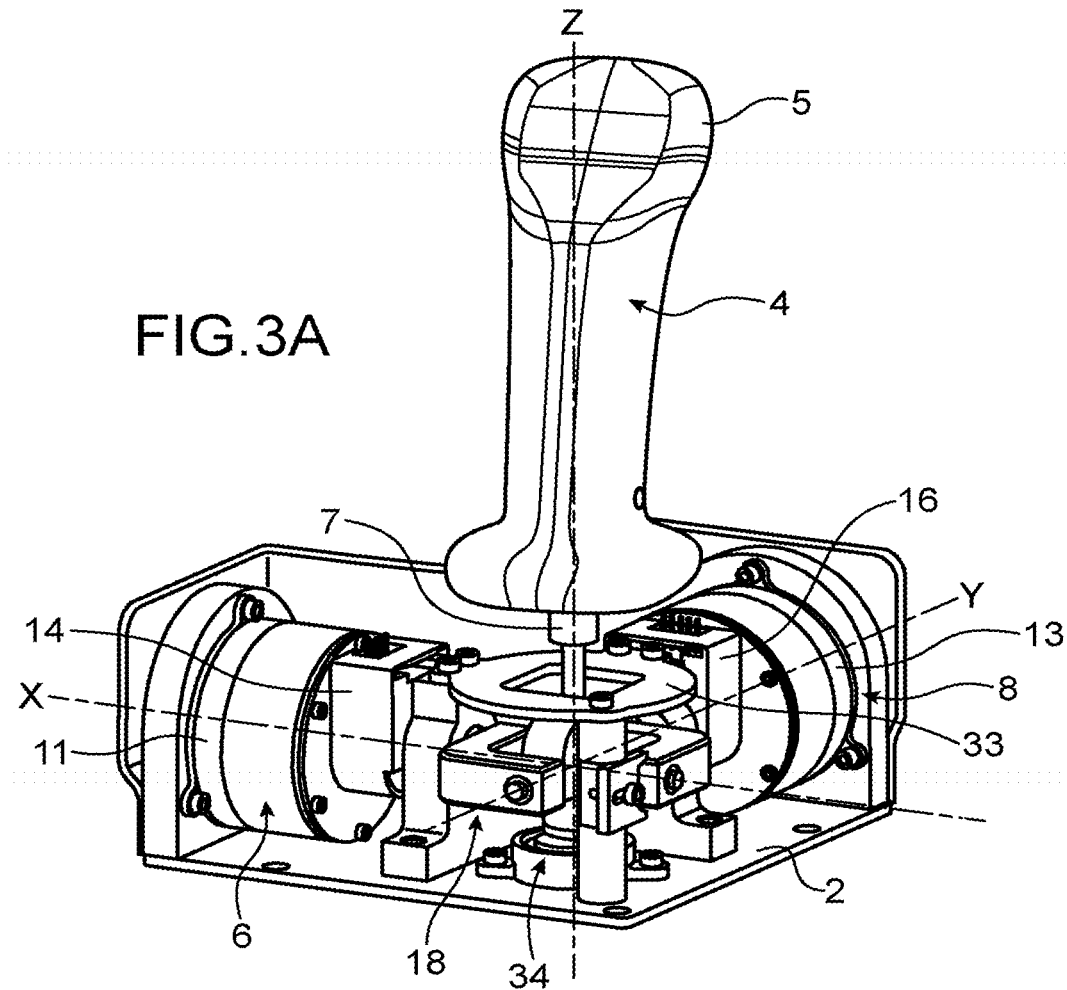
FIG. 3A is a perspective view of an embodiment of a haptic interface according to the invention.
Figure 3B:
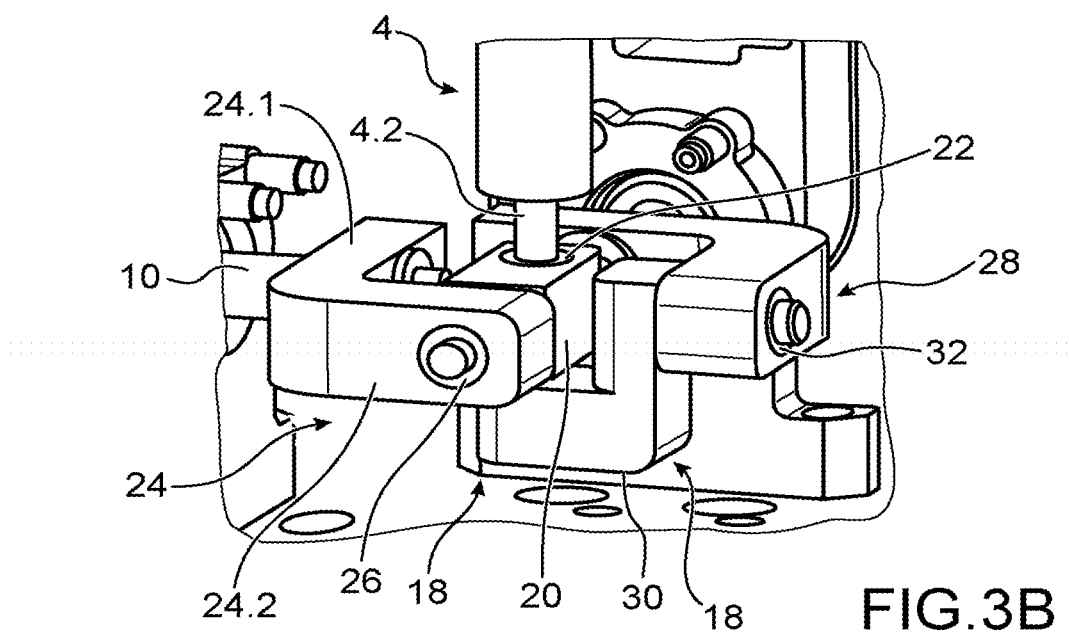
FIG. 3B is a detailed view of FIG. 3A on the cardan connection, FIG. 4 diagrammatically shows an effector provided with a force detector that can be implemented in this invention, FIG. 5 graphically shows the guiding obtained thanks to the haptic interface according to the invention, FIGS. 6A and 6B diagrammatically show other embodiments of haptic interfaces with two degrees of freedom according to the invention.

FIGS. 3A and 3B show a practical example of a haptic interface with two degrees of freedom according to the invention. It will be understood that this example is in no way limiting as shall be described in the rest of the description.

The effector 4 has in the example shown the shape of a joystick extending in the rest position along a longitudinal axis Z substantially perpendicular to the frame 2 and comprises a first longitudinal end intended to be grasped by the hand of the operator and provided for example with a knob 5 and a second longitudinal end mechanically connected to the brakes. The knob is mounted on a rod 7 comprising the second longitudinal end 4.2.

In the example shown, the brake 6 is oriented along an axis X and the brake 8 is oriented along an axis Y perpendicular to the X axis and both are perpendicular to the axis Z. The axes X and Y define a plane parallel to the plane of the frame. The brake 6 comprises a shaft 10 (FIG. 3B)) extending along the X axis and the brake 8 comprises a shaft (not visible) extending along the Y axis.

In the example shown, the two brakes 6 and 8 have similar structures, only the brake 6 shall be described in detail. It will be understood that a haptic interface comprising brakes with different structures does not depart from the scope of this invention. Magnetorheological brakes have the advantage of having a relatively low cost and a small size while still having substantial dynamics in braking torque and a fast response time.

An example of a brake is given for example in document WO2016050717. The brake 6 comprises a shaft 10 mobile in rotation about the X axis and mounted in a case. The shaft 10 comprises an end mechanically connected to the second end 4.2 of the joystick 4 and a second end (not visible) that interacts with a magnetorheological fluid. The second end of the shaft is for example integral in rotation with a skirt arranged in a chamber filled with magnetorheological fluid. The brake also comprises means for generating a magnetic field in the chamber in such a way as to cause a modification of the apparent viscosity of the magnetorheological fluid. When the viscosity increases, a resistive torque is applied on the skirt and on the shaft 10, and in fact on the joystick via the mechanical connection between the shaft 10 and the joystick 4.

In the example shown, the interface comprises angular position sensors 14 and 16 measuring the angular position of the shafts of the brakes 6, 8. This can be for example incremental optical encoders or magnetic encoders.

The sensor of intention of action from the user determines at least the direction of the force applied by the user on the joystick in such a way as to identify the intention of a user before a change in position of the joystick is effectively detected.

In the rest of the description, the sensor of intention will be designated as force sensor or torque sensor for the purposes of simplicity.

In order to determine the force exerted on the joystick, it is possible to detect the torques around the axes X and Y on brakes 6 and 8.

In the example shown, each brake 6, 8 comprises a torque sensor 11, 13 respectively on brakes 6, 8. An example of such a sensor is described in document WO2016050717. It comprises for example a proof body of which the deformation caused by the torque applied by the user is detected by force sensors. The proof body can be fixed by one end of the frame of the interface and by another end to the magnetorheological brake, for example the case 8. The force sensors are in contact with the proof body at the end thereof integral with the case of the brake.

The proof body can comprise a cylindrical shape body with a circular section. The proof body is for example made of plastic material, such as ABS.

When a torque is applied on the shaft of the brake 6, the latter cause a deformation by torsion of the proof body by the intermediary of the case of the brake itself in interaction with the fluid, which itself is in interaction with the skirt which is linked to the shaft. This deformation is detected by the force sensors.

The material of the proof body and its geometry can be determined according to the minimum torque and of the maximum torque applied, to the sensitivity of the force sensors and the desired detection threshold. Furthermore, the deformation of the proof body is such that it cannot be perceived by the user. For example, it can be considered that a deformation of the proof body of a few microns cannot be perceived by the user.

Alternatively, it is possible to measure the forces directly on the case or on the rotating shaft, for this a torque sensor will be implemented.

The force sensor is for example carried out with piezoresistive elements assembled in the form of a Wheatstone bridge, they allow for a sensitivity of about a few tens of mV per Newton with a stiffness that is high enough to limit the displacement to a few tens of microns at full load. Alternatively, the force sensor or sensors could be replaced with one or several deformation sensors formed, for example, by strain gauges directly applied on the proof body in order to detect the deformation thereof.

By knowing the torques around the directions X and Y, it is possible to determine the force applied to the joystick.

Alternatively and preferably, it is possible to directly detect the force on the joystick, which makes it possible to obtain a more precise measurement of the force applied by the user.

The sensor or sensors linked directly to the effector and the torque sensor or sensors arranged on the brakes can be for example piezoresistive, piezoelectric, capacitive, magnetic or optical.

Preferably, the sensor has high sensitivity and great rigidity, in such a way that it does not disturb or disturbs very little the sensation of the user.

Figure 4:
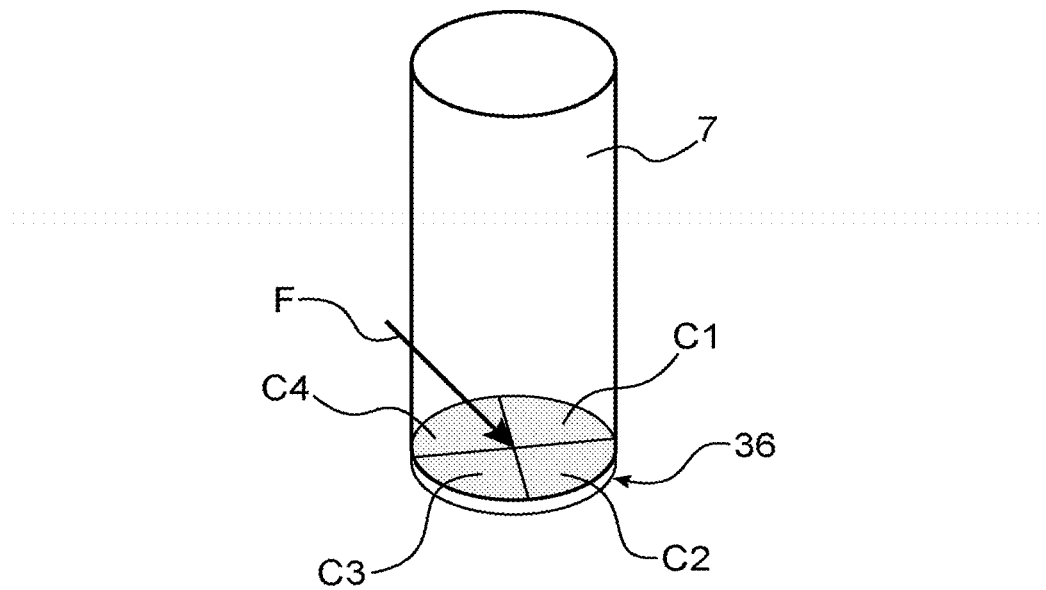

FIG. 4 shows an example of a capacitive sensor 36 mechanically linked to the effector. F designates the force exerted on the effector 4.

The force sensor comprises a polymer matrix which is intended to be deformed by the force exerted by the user on the effector. For this the sensor can be positioned, for example pinched, between the upper portion of the effector 4 which is manipulated by the user, and the lower portion of the effector linked to the axis 7, in such a way as to undergo the forces of interaction between the effector and the brakes. The sensor comprises for example four capacitors C1, C2, C3, C4 in the shape of a quarter-circle. The application of a force on the effector causes a deformation of the matrix and therefore a variation of one or of several capacitances of the capacitors. By analysing which capacitor or capacitors have had their capacitance vary and in which proportion, it is possible to determine the direction and the amplitude of the force applied by the user on the effector.

Alternatively, multi-axis sensors with a strain gauge developed for example by the company ATI could be used. These sensors use piezoresistive strain gauges associated with electronics that are adapted to measure the forces in several directions. Multi-axis sensors based on optical detection proposed by the company Optoforce and piezoelectric multi-axis sensors proposed by the company Kistler can also be used.

The two brakes are assembled in parallel via a mechanical connection 18 between the joystick 4 and the shafts. This is a cardan system well known to those skilled in the art of which a non-limiting example is shown in FIGS. 3A and 3B.

In the example shown, the end 4.2 of the joystick 4 is mounted in a part 20 by means of a sliding pivot 22. The shaft 10 is connected to the part 20 by a part 24 in the shape of an L, one branch 24.1 of the L being integral with the shaft 10 and the other branch 24.2 of the L being articulated on the part 20 by a sliding pivot 26.

The shaft 10 of the brake 8 is connected to the part 20 via two L-shaped parts 28, 30. The two L-shaped parts 28, 30 are articulated between L by a sliding pivot connection 32, the L-shaped part 28 is articulated in rotation on the shaft of the brake 8 and the L-shaped part 30 is integral in rotation on the part 20.

The interface comprises abutments in order to limit the displacement in the plane X and Y of the joystick, in the example shown the abutments are formed by a frame 33 arranged around the joystick above the cardan joint.

Advantageously, the interface comprises return means 34 for returning in rest position, i.e. the joystick coaxial with the axis Z. These means are for example of the magnetic type arranged between the frame 2 and the cardan joint. This is for example two permanent magnets aligned with the axis Z, one being carried by the frame and the other by the cardan system and exerting a magnetic return force. Alternatively, a spring return system could be used, however it could induce friction.

The joystick can then be displaced about the two axes X and Y and the brakes 6, 8 are able to apply resistive torques about its axes according to the position of the joystick and/or of the intention of action from the user.

On the one hand, any other articulation between the joystick and the brakes making it possible to create an interface with at least two degrees of freedom is within the scope of this invention, such as the one described for example in the document Bin Liu. *Development of 2d haptic devices working with magnetorheological fluids*. Master's thesis, University of Wollongong, Australia, 2006 or in the document A. Milecki, P. Bachman, and M. Chciuk. *Control of a small robot by haptic joystick with magnetorheological fluid. Mechatron. Syst. Mater.-MSM*, 7, 2011.

On the other hand, the brake structure could be different. Instead of a skirt, for example a disc could interact with the magnetorheological fluid. Moreover, the brake could be of the electrorheological or electromagnetic type. It can also be considered to use ultrasonic actuators that use the principle of ultrasonic lubrication.

Such actuators use for example piezoelectric ceramics set into vibration. Contrary to magnetorheological and electrorheological brakes, ultrasonic actuators have a maximum resistant force when no current is supplying the actuators. An ultrasonic brake that can be used in haptic devices is for example described in the document Koyama, Tatsuya, Kenjiro Takemura, and Takashi Maeno. "*Development of an Ultrasonic Brake.*" *Journal of Advanced Mechanical Design, Systems, and Manufacturing* 1, no. 1 (2007): 122-129.

In addition, the axes of the brakes may not be perpendicular. Furthermore, the interface could comprise more than two brakes, for example it could comprise three axes at 120°, each one provided with a brake.

The structure could have three degrees of angular freedom.

Moreover, mechanical amplification systems, for example with capstans or gears could be used to reinforce the sensations of abutment or reduce the size.

It can also be considered that the effector 4 be mobile along the axis Z offering a third degree of freedom. The effector 4 could also be controlled in rotation about the axis Z.

Figure 6A:
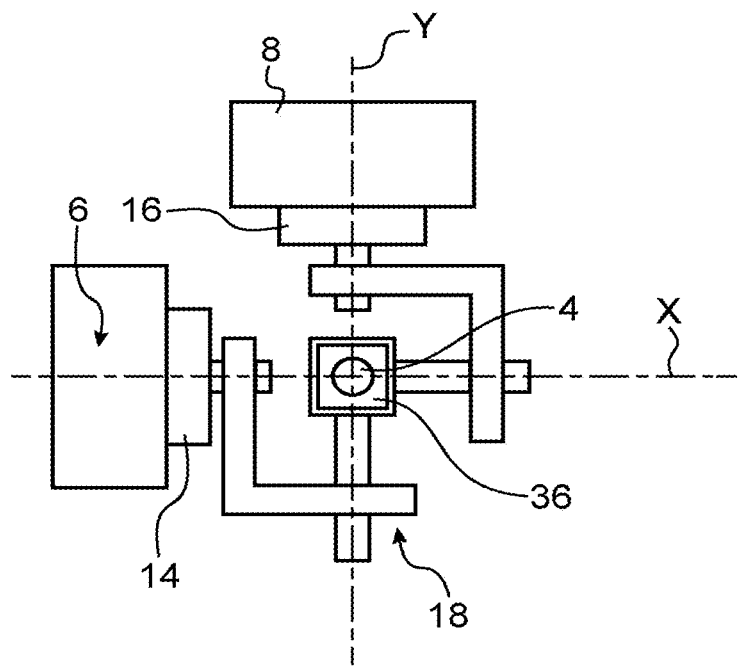
Figure 6B:
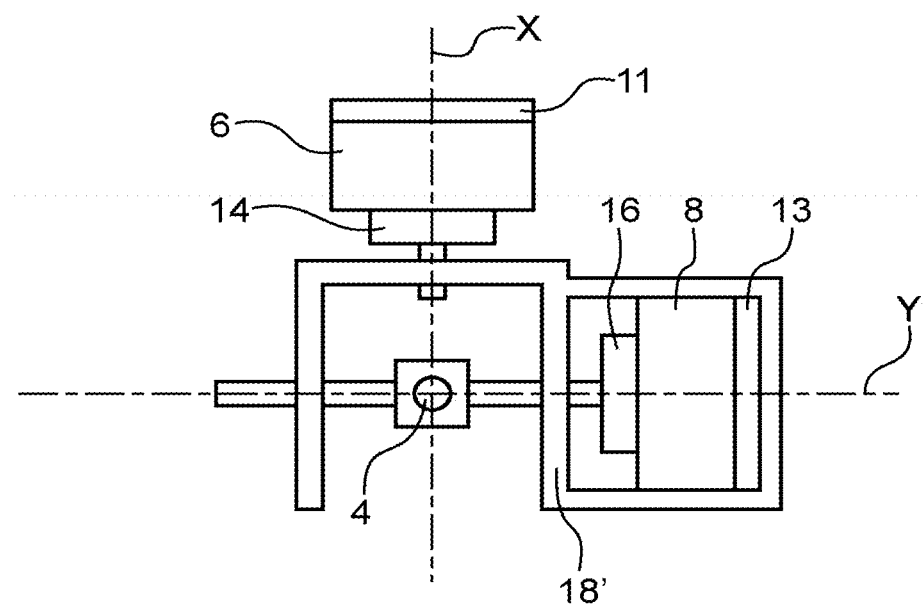

FIGS. 6A and 6B show other embodiments of an interface with two degrees of freedom according to the invention. The same references as those used for the FIGS. 3A and 3B are used for the FIGS. 6A and 6B.

In FIG. 6A, the structure of the cardan connection is similar to the structure of the interface of FIGS. 3A and 3B, but the sensor of intention of action from the user is linked to the effector 4 and comprises a force sensor 36 that directly measures the force applied on the effector 4.

In FIG. 6B, the two brakes are assembled in series by a cardan connection 18', the intention of action is obtained thanks to measurements of the torques on the brakes as for the interface of FIGS. 3A and 3B.

An example of the operation of the interface shall now be described.

The user grasps the joystick and moves it. The position sensor or sensors measure the position of the joystick around the axes X and Y and the sensor or sensors of intention detect at least the direction of the force exerted by the user on the joystick. The information is processed by a control unit that sends orders to the brakes to generate a given resistance about the axes X and Y according to the predetermined haptic patterns to be reproduced according to the position of the joystick. The displacement speed vector (direction and amplitude) of the joystick and/or the acceleration vector (direction and amplitude) can also be taken into account, the latter can be obtained by deriving the measurements taken by the position sensor.

Electromagnetic fields are generated in the brakes which causes an increase in the viscosity of the magnetorheological fluid.

Magnetorheological and electrorheological brakes have a very short response time, of about a few milliseconds, and a substantial resistive force dynamics. They can therefore produce a large variety of haptic patterns.

The brakes can simulate abutments, indicating for example to the user that he has reached a limit configuration that he does not have the right to exceed, reprogrammable notches with various spatial frequencies and various shapes, for example rectangular, sinusoidal, triangular, a variable resistor, etc. the haptic patterns can be such that they provide a guiding of the joystick in a given direction.

As indicated hereinabove, the controlling of the brakes is carried out based on the state of actuation of the joystick, i.e. based on its position and at least the direction of the force applied by the user on the joystick. The control unit can also take account of the direction and of the amplitude of the speed vector, and/or of the direction and of the amplitude of the displacement acceleration vector of the joystick and/or of the amplitude of the force applied on the joystick.

Thanks to the information supplied on the direction of the force applied to the joystick, it is possible to guide the joystick along complex trajectories.

Figure 5:
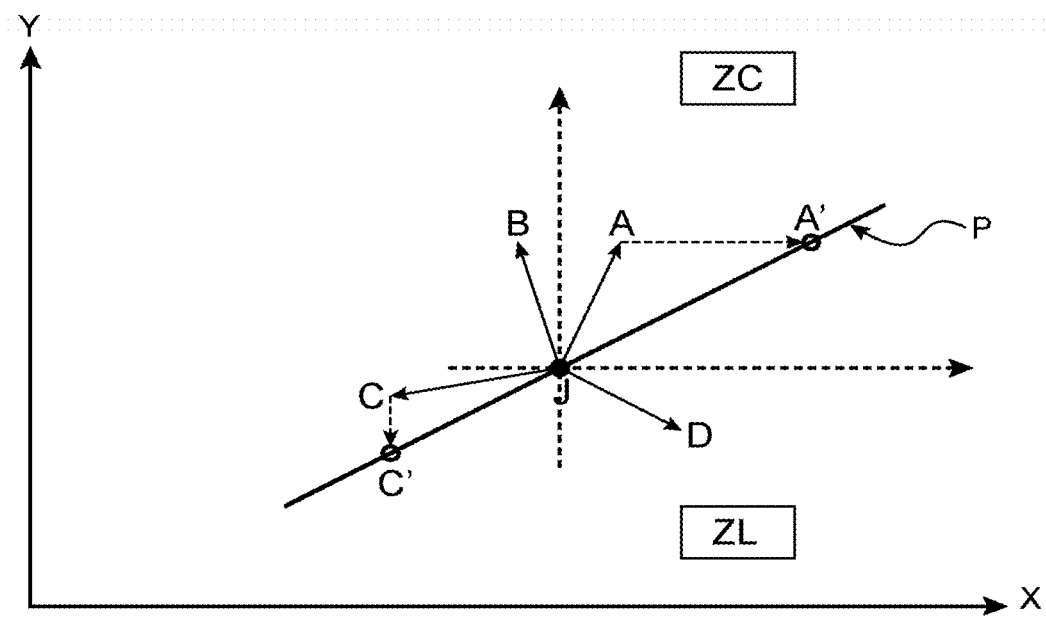

A graphical representation of an example of guiding is shown in FIG. 5.

It is desired for example to carry out a virtual abutment of the joystick along a plane P diagonally shown in grey in FIG. 5. The zone ZL located under the plane P is free, i.e. no action of the brakes is limiting the displacement of the joystick and the zone ZC located above the plane P is controlled, i.e. the control unit controls the brakes so that they apply resistive forces on the joystick.

The information provided by the position sensors makes it possible to determine the position of the joystick. If the joystick is in the free zone ZL, no order for activating the brakes is given, the joystick can be displaced freely.

If the joystick is located in the guiding plane P at the point J, the direction of the force applied by the user is determined using a force or torque sensor or sensors.

If the force detected has a direction that tends to cause a movement inside the controlled zone ZC (grey zone in FIG. 5) in the direction of the point A, then the control unit sends an order to the brake 8 to block the movement about the Y axis and to the brake 6 to release any force around the X axis. The user is then encouraged to join the point A' located on the plane P.

If the force detected has a direction that tends to cause a movement inside of the controlled zone ZC in the direction of the point B, then the control unit sends orders to the brakes 6 and 8 to block the movements around axes X and Y.

If the force applied has a direction that tends to cause a movement inside the controlled zone ZC in the direction of the point C, then the control unit sends an order to the brake 6 to block the movement around the X axis and to the brake 8 to release any resistive force around the Y axis, so as to encourage the user to join the point C'.

If the force applied has a direction that tends to cause a movement outside of the controlled zone ZC in the direction of the point D, then the brakes X and Y are released.

Very advantageously, it can be provided that the intensity of the resistive force around one or the other of the directions depends on the position of the joystick with respect to the guiding plane. For example, it can be provided that the more the joystick penetrates into the controlled zone, the greater the forces are that are applied by the brakes. The sensed effect would then be a "soft zone" of transition between the free zone and the controlled zone in order to report to the user that he has crossed the plane P and that he has entered a controlled zone.

Very advantageously, the force sensor or sensors measure the intensity of the force exerted by the user. The resistance applied by the brake or brakes can be modulated according to the intensity of the force, which makes it possible to offer a more flexible guiding instead of the sensation of an abutment or wall which does not assist the guiding. The haptic sensation is then substantially improved.

It will be understood that the plane could be curved, for example the controlled zone could be located inside or outside a circle. Furthermore, it shall be understood that the zone ZL could also be a controlled zone, the effector would then be guided along the plane P or along a curve for example a circle. For example the joystick 4 could, according to a given haptic pattern, be authorised only to pivot about the axis Z along a closed curve that forms a circle. Any other trajectory can be considered, it can combine straight portions of different directions, curved portions with different curvatures, straight portions and curved portions, etc.

Thanks to the invention, knowledge is available as early as possible of the direction wherein the user has the intention to displace the joystick, making it possible to consequently control the brakes. The fast response time of magnetorheological and electrorheological brakes allow for transparent use with respect to the user who is not aware of the activation of the brakes which suppresses the "sticky" effects and contributes to giving the sensation of mechanical device and not of an electromechanical brake.

Measuring the force makes it possible in particular to carry out more easily the haptic patterns of the abutment or free wheel type wherein the movement is blocked when the user exerts a force towards a precise direction. This allows the controller to make actuation decisions without the effector having moved, it is thus possible, as shown in the image hereinbelow, to block the displacement according to a certain angular range as shown in FIG. 2.

Furthermore by using highly responsive brakes, a very fine guiding of the effector is obtained.

The reaction time of the magnetorheological system is less than 10 ms, more preferably of about a few milliseconds, for example between 3 ms and 5 ms.

In the case with a brake that uses an acoustical lubrication technology, the reaction time can be less than 1 ms. For example the global loop time (measurement+actuation) can be less than 10 ms. By considering only the measurement, a frequency of 1 kHz can be chosen, which corresponds to 1 ms between 2 measurements.

Thanks to the invention, we have a haptic interface that offers an effective guiding of the effector and that has a good haptic sensation and that ensures the safety of the user, as it implements passive brakes contrary to the haptic interfaces that implement electric motors.

A haptic interface according to the invention can be used in the automobile field to equip a dashboard and control various functions without requiring the visual attention of the user, in the aeronautics field, in the field of remote control, in the field of video games.

The invention claimed is:

1. A haptic interface with at least two degrees of freedom comprising:
   at least one element for interacting with a user;
   at least two passive brakes each extending along an axis, each of the brakes being capable of exerting a resistive force about its axis, said forces being controllable;
   at least one position sensor for measuring a position of the element for interacting with a user;
   at least one intention detector for detecting the user's action intention on the element for interacting with the user before a change in position of the element for interacting is detected; and
   a control unit capable of sending commands to said brakes depending on information on the position of the element for interacting with the user and on the intention of action from the user, such that said passive brakes generate resistive forces according to at least one given haptic pattern.

2. The haptic interface according to claim 1, wherein the intention detector detects the direction of a force applied on the element for interacting with the user.

3. The haptic interface according to claim 2, wherein the intention detector measures the intensity of the force.

4. The haptic interface according to claim 1, wherein the intention detector comprises at least one force sensor linked to the element for interacting with the user.

5. The haptic interface according to claim 4, wherein the force sensor is a capacitive sensor in contact with the element for interacting with the user and comprises at least several variable capacitors, of which the capacitance varies according to at least the direction of the force applied on the element for interacting with the user.

6. The haptic interface according to claim 1, wherein the intention detector comprises a sensor on each brake, each one of said sensors being able to detect the torques exerted about one of the axes.

7. The haptic interface according to claim 1, wherein the passive brakes comprise a fluid of which the apparent viscosity varies according to an external stimulus, and a system for generating said external stimulus by control in said fluid, and an element for interacting with the fluid arranged in the fluid and mechanically connected to the element for interacting with the user.

8. The haptic interface according to claim 7, wherein the element for interacting with the user and the passive brakes are mechanically connected by a cardan joint.

9. The haptic interface according to claim 7, wherein the fluid of which the apparent viscosity varies according to an external stimulus is a magnetorheological fluid.

10. The haptic interface according to claim 1, comprising a magnetic return device for returning the element for interacting with the user in a rest position.

11. A method for controlling a haptic interface according to claim 1, wherein, when the control unit applies a haptic pattern for guiding the element for interacting with the user at least along one side of a given plane, the control unit:
   determines the position of the element for interacting with the user,
   determines at least the direction of the force applied on the element for interacting with the user, and
   sends orders to the passive brakes in such a way the resistive forces generated encourage the user to come closer to the plane.

12. The method for controlling according to claim 11, wherein the intensity of the force applied on the element for interacting with the user is measured and the intensities of the resistive forces applied by the passive brakes depend on the intensity of the force.

13. The method for controlling according to claim 11, wherein the element for interacting with the user is guided only on one side of the plane and wherein the intensities of the resistive forces applies by the passive brakes depend on the position of the element for interacting with the user with respect to the plane, in such a way as to provide the user with a haptic sensation when the plane is crossed.

14. The haptic interface according to claim 1, wherein the brakes guide the element in a given direction.

15. The haptic interface according to claim 1, wherein the brakes block motion of the element in a given angular range.

16. A haptic interface with at least two degrees of freedom comprising:
   at least one element for interacting with a user;
   at least two passive brakes each extending along an axis, each of the brakes being capable of exerting a resistive force about its axis, said forces being controllable;
   at least one position sensor for measuring a position of the element;
   at least one intention detector for detecting the user's action intention on the element before a change in position of the element is detected; and
   a control unit configured to send at least one command to the brakes to produce at least one haptic pattern to control the element based upon the position of the element measured by the sensor and based upon the intention measured by the intention detector.

* * * * *